April 11, 1961 A. JOVIS 2,979,095
MACHINE FOR TEARING MUFFINS
Filed June 19, 1958 3 Sheets-Sheet 1
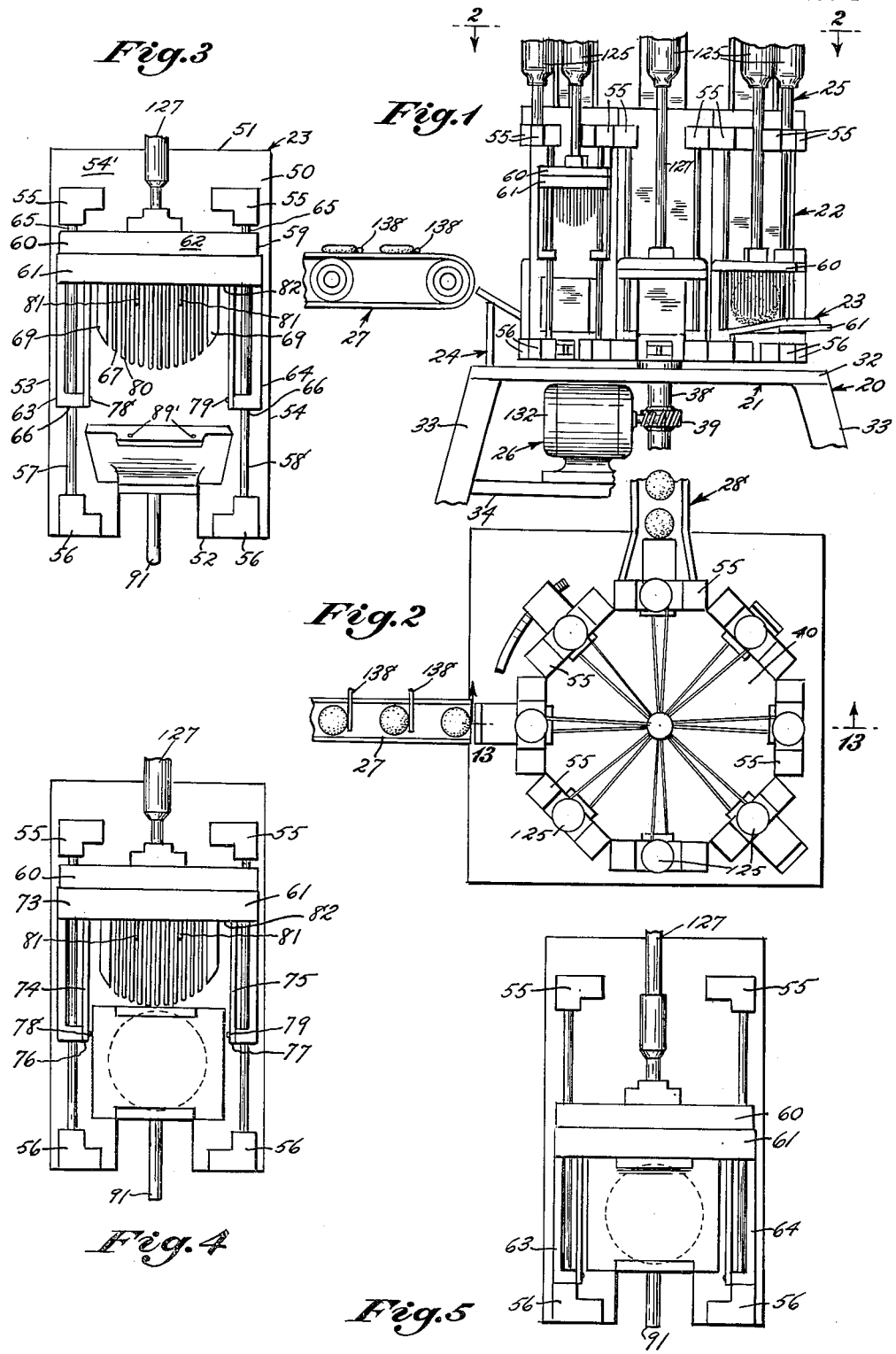

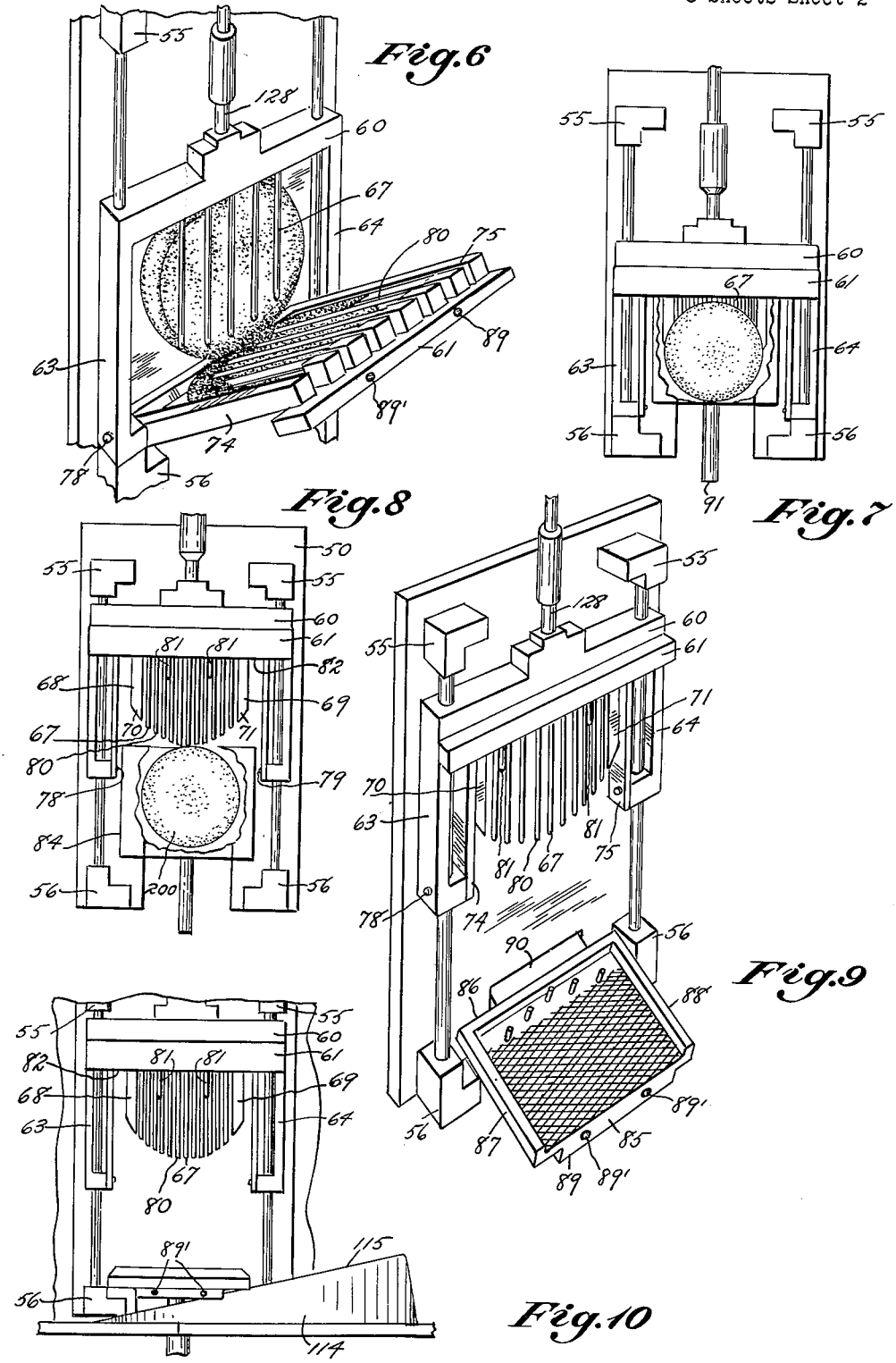

April 11, 1961     A. JOVIS     2,979,095
MACHINE FOR TEARING MUFFINS
Filed June 19, 1958     3 Sheets-Sheet 3

United States Patent Office 2,979,095
Patented Apr. 11, 1961

2,979,095
MACHINE FOR TEARING MUFFINS
Arthur Jovis, 152 W. 42nd St., New York, N.Y.
Filed June 19, 1958, Ser. No. 743,178
5 Claims. (Cl. 146—72)

This invention relates generally to the field of food making machinery, and more particularly to an improved device for tearing apart partially or fully baked products, including pan baked products such as English muffins, or the like.

Such products have heretofore been sold by bakers in integral form, with instructions to the effect that they are to be pulled or torn apart prior to toasting in order that a rough "crumbly" surface is obtained which when heated absorbs melted butter in a superior manner as contrasted with a smooth cut surface. Unfortunately, in the raw state in which the products are marketed, it is difficult, if not impossible, to pull most of the muffins apart in an even manner to provide two generally symmetrical halves, the most common result being that one of the halves tears before it is completely separated from the other half, thus making the muffin unsuitable for toasting in conventional toasting devices.

In my Patent No. 2,840,129 granted June 24, 1958 and entitled muffin tearing devices, I have disclosed a device capable of efficiently parting individual English muffins by the use of separable sets of tines which are adapted to be extended into the soft central body of a muffin while disposed in a single plane and moved in such manner that sets of tines serve to pull apart the muffin without resorting to a cutting type action. A device of this type, while suitable for home use, is not capable of sufficiently high speed operation to be suitable on a commercial basis by baking establishments or distributors.

It is therefore among the principal objects of the present invention to provide an improved machine for tearing English muffins and similar semi-baked products of the type described which will perform the above described operation at a relatively high rate of speed, and be capable of substantially automatic operation.

Another object of the invention lies in the provision of an improved muffin tearing machine capable of parting individual muffins into two substantially similar halves of equal thickness while producing a uniformly crumbly surface at the torn portions of the muffin.

Another object of the invention lies in the provision of muffin tearing structure of the class described in which the cost of fabrication may be of a reasonably low order, with consequent wide sale, distribution and use.

Another object of the invention lies in the provision of a muffin tearing device possessed of the above advantages which may be readily disassembled for servicing and maintaining the same in a sanitary condition.

A feature of the invention lies in the fact that the device is suitable for operation in conjunction with conveyor belt operation, or other suitable magazine feed (not shown) thereby requiring a minimum of attendance on the part of an operator over relatively substantial periods of operation.

These objects and features, as well as other incidental ends and advantages, will more fully appear during the course of the following disclosure, and be pointed out in the appended claims.

In the drawings, to which reference will be made in the specification, similar reference characters have been employed to designate corresponding parts throughout the several views.

Figure 1 is a fragmentary side elevational view of an embodiment of the invention.

Figure 2 is a fragmentary plan view thereof.

Figure 3 is an enlarged side elevational view showing one of the individual muffin tearing units comprising the device in a first stage of operation prior to the loading of the same with an uncut or untorn muffin.

Figure 4 is a similar view in elevation showing a second stage of operation in which the muffin is retained in relatively fixed position prior to the insertion of means for tearing the same.

Figure 5 is a similar view in elevation showing a third stage with the entry of separable tine structure into the body of the muffin.

Figure 6 is a perspective view of a muffin tearing unit showing a fourth stage of operation in which the body of a muffin is separated.

Figure 7 is a view in elevation partly broken away to show detail of a muffin tearing element showing a fifth stage of operation in which the muffin has again been pressed together, prior to raising of the tines for discharge of the muffin.

Figure 8 is a view in elevation partly broken way showing a sixth stage of operation in which the separating tine structure has been raised immediately prior to discharge of the separated muffin.

Figure 9 is a view in perspective showing an individual muffin tearing element in a seventh stage of operation during which time the separated muffin is ejected for subsequent packaging.

Figure 10 is a view in elevation of a muffin tearing element showing an eighth and final stage of operation, in which the parts are being returned to the condition shown on Figure 3 for the commencement of another cycle of operation.

Figure 11:
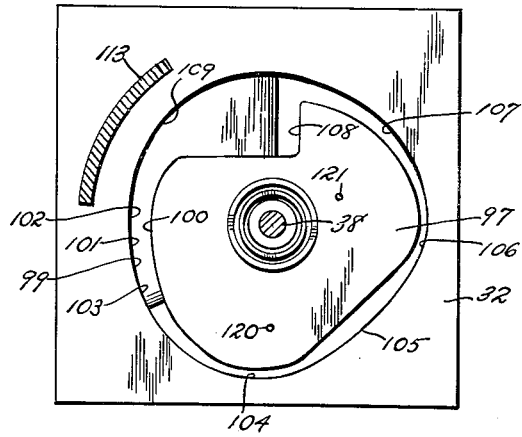
Figure 11 is an enlarged fragmentary horizontal sectional view as seen from the plane 11—11 on Figure 13.

In accordance with the invention, the device, generally indicated by reference character 20 comprises broadly: a base element 21, a rotating stage element 22, a plurality of muffin tearing elements 23, muffin tearing element control means 24, muffin tearing tine actuating means 25, prime mover means 26, incoming conveyor belt means 27 and outgoing conveyor belt means 28.

The base element 21 is best seen on Figure 1 of the drawing, and includes a horizontally disposed platform 32, a plurality of legs 33 and a bracing platform 34. The bracing platform 34 is provided with a centrally disposed bearing 35, and a similar bearing 36 is positioned in the platform 32 for supporting the stage element 22. (See Figure 13.)

The rotating stage element 22 is best seen on Figures 1 and 2, and includes a supporting shaft 38 having worm gear means 39 thereon driven by the prime mover means 26, as will more fully appear. Supported by the shaft 38 is an upper horizontally disposed member 40, a plurality of vertical support members 41 and a lower horizontal support member 42. A horizontal switch supporting member 45, having a centrally disposed opening 43 is disposed below the support members 40 and 42, and carries on the lower surface 47 thereof components of the control means 24. The centrally disposed opening is aligned coaxially with the axis of the shaft 38.

Referring to Figure 3 on the drawings, the muffin tearing elements 23 are substantially similar, and accordingly, a detailed description of one of such elements will suffice to describe all, thereby avoiding needless repetition. In the embodiment shown on the drawings, the muffin tearing elements are eight in number, although it will be understood by those skilled in the art that by varying the arrangement of the control means 24 and actuating means 25 the number of stations may be increased or decreased to allow for lower or higher speed operation.

A muffin tearing element includes a planar base plate member 50 bounded by an upper edge 51, a lower edge 52 and side edges 53 and 54. Mounted on the outer surface 54' of the base plate member 50 are a pair of upper brackets 55 and a pair of lower brackets 56 which support left and righthand vertical rods 57 and 58, respectively. A sliding frame 59 rides upon the rods 57 and 58 under the action of the means 25. The frame 59 includes a reciprocating member 60 and a pivotal member 61 arranged for orbital motion with respect to the members 60 at the lower ends thereof. The reciprocating member 60 includes a horizontal portion 62 and a pair of vertical portions 63 and 64. The horizontal portion 62 includes a pair of upper bearings 65 while the vertical portions 63 and 64 each include a lower bearing 66 see Fig. 3 thus confining the portion 60 to vertical planar motion. Depending downwardly from the horizontal portion 62 is a first plurality of muffin tearing tines 67.

The pivotal member 61 also includes a horizontal member 73 as well as vertical members 74 and 75, the lower ends 76 and 77, respectively, of which are provided with pintles 78 and 79 which extend through the vertical portion 63 and 64 of the reciprocating member 60. A second set of tines 80 depends from the horizontal member 73, the same being so arranged so as to be positionable between the first plurality of tines 67 when the relative position of the members 60 and 61 is as shown on Figure 3, as well as left and righthand slitting blades 68 and 69, see Figure 8, having angularly disposed sharpened edges 70 and 71, respectively. Extending downwardly from the lower surface 82 of the horizontal member 73 are pins 81 which engage the muffin retaining member 84 at point 89' (Figures 9 and 10).

The muffin retaining member 84 serves to hold individual muffins, generally indicated by reference character 200, in position upon the base plate member 50 in the plane of movement of the sliding frames 59 to permit the same to be pierced by the tines 67 and 80. The base plate member 50 and retaining member 84 are knurled to assist in maintaining the muffin in proper position for piercing. The muffin retaining member 84 is bounded by an upper edge 85, a lower edge 86 pivotally associated with the base plate member 50, and side edges 87 and 88. A projecting strip 84' includes holes 89' engaging with the pins 81, while a cam follower support member 90 supports a cam follower 91 (Figure 7) extending downwardly from the edge 86.

Figure 12:
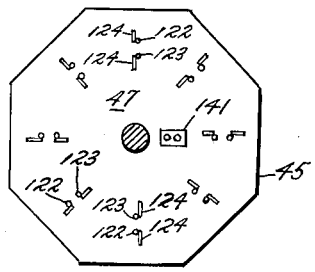
Figure 12 is a view in elevation as seen from the plane 12—12 on Figure 13.

The muffin tearing element control means 24 is best seen on Figures 11 and 12 in the drawings, and includes a cam plate 97 formed integrally on the horizontal platform 32. A curved irregularly shaped opening 99 therein provides cam means engaging the cam follower 91 of each of the individual muffin tearing elements 23. The opening 99 is bounded by an inner surface 100 and an outer surface 101, and includes a first portion 102, a second portion 103, a third portion 104, a fourth portion 105, a fifth portion 106, a sixth portion 107, a seventh portion 108, and an eighth portion 109. A cam member 113 is supported on the platform 32 opposite the eighth portion 109, the cam including a lower portion 114 having mounting means and an inclined cam face 115.

Figure 13:
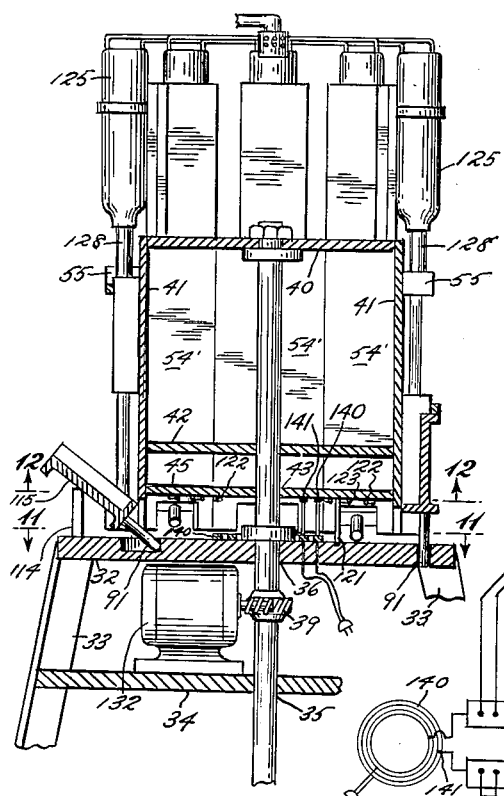
Figure 13 is an enlarged horizontal sectional view as seen from the plane 13—13 on Figure 2.
Figure 15:
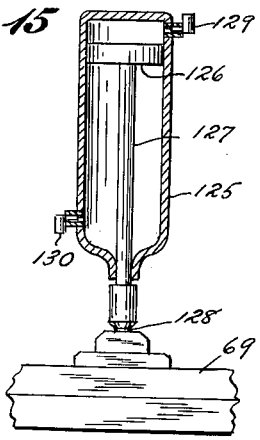
Figure 15 is a fragmentary sectional view partly in elevation showing the details of an air cylinder used in conjunction with the device.
Figure 14:
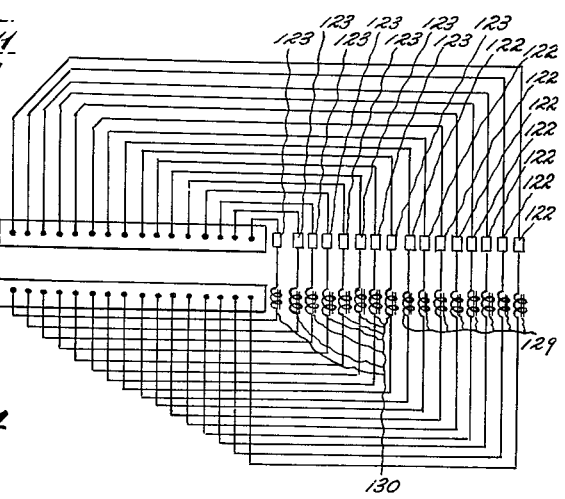
Figure 14 is a schematic view showing the electrical circuits for sequential operation of certain valves.

The tine actuating means 25 is best understood from a consideration of Figures 13, 14, and 15. The switch supporting member 45 is positioned to overly the cam plate 97 which is provided with a first switch trigger 120 and a second switch trigger 121, the former of which is adapted to actuate a first set of switches 122, and the second of which actuates a second set of switches 123. the switches 122 and 123 are of the precision type, each being provided with a tripping tongue 124. Mounted on upper horizontal support member 40 are a plurality of air cylinders 125, each including a piston 126 and rod 127, the lower end of which engages a socket 128 on the member 60 of each of the muffin tearing elements 23. Each air cylinder is provided with an upper valve 129 and a lower valve 130. Each of the first set of switches 122 is connected to an upper valve 129 on one of the air cylinders, and each of the second set of switches 123 is connected to a lower valve 130 thereof.

The prime mover means 26 includes a fractional horsepower electric motor 132, preferably with integrally built gear reduction means (not shown) engaging the worm gear means 39. Where desired, this form of motor power may be substituted by belt driven means (not shown) or other suitable motion inducing structure.

The conveyor element means 27 and 28 (Figure 1 and 2 are substantially similar. The means 27 includes retractable muffin engaging members 138 for serially feeding individual muffins 200 into engagement with successive muffin tearing elements at the first station. If desired, a small apron (not shown) may be provided to lead to the individual muffin retaining members 84. The retractable members 138 may be of any suitable timed type, as for example that disclosed U.S. Patents No. 2,353,761 and 2,434,053.

The operation of the device is best understood from a consideration of Figures 3 to 10, inclusive. The operating cycle comprises eight stages during which time an individual muffin is loaded upon one of the muffin tearing elements, and sequentially pierced, torn, reassembled and discharged. Referring to Figure 3, the muffin tearing element 23 shown thereon is in position for reception of an untorn muffin. This position corresponds to the leftwardmost muffin tearing element as seen on Figures 1 and 2.

Following the depositing of a muffin on the inner surface of the muffin retaining member 84, the stage element 22 rotates in a counterclockwise direction as seen on Figure 2 during which time the cam follower 91 is guided from the first position 102 on the cam plate 97 to the second position 103 at which time the muffin retaining member is brought to a vertical position compressing the muffin against the exposed surface of the base plate member 50. In the movement to the next position corresponding to the lowermost element 23 shown on Figure 2, the muffin is maintained in compressed position and the first switch trigger 120 contacts the tongue 124 of a switch connected to an upper valve 129 of the element 23. In this position, the air cylinder 125 is activated to drive the sliding frame 59 downwardly wherein the first plurality of tines 67 and second plurality of tines 80 pierce the muffin. During this action, the blades 68 and 69 sever small areas on the leftward and rightward extremity of the muffin, these areas being sufficiently small not to affect the finished appearance of the torn muffin. On moving to the next station, the fourth portion 105 of the cam 99 moves the muffin retaining member 84 to a position similar to that at the first stage. At this time, however, the engaging portions 81 have engaged the strip 89 so that the pivotal member 61 moves with the same wherein the first and second pluralities of tines 67 and 80 part, tearing the muffin shown on Figure 6. In the next stage of the operating cycle, the frame is returned to its original position as indicated on Figure 7, and as shown on Figure 8, the next stage results in the tripping of one of the second set of switches 123 wherein the frame 59 is returned to its uppermost position. On reaching the seventh stage, the seventh portion of the cam 109 permits the cam follower 91 to pivot through substantially 120° from the vertical position, and the natural resiliency of the compressed muffin moves the muffin retaining member 84 to the position shown on Figure 10 wherein the muffin slides under the action of gravity to the conveyer belt means 28.

In the eighth stage, the muffin retaining member 84 strikes the inclined cam face of the cam 113 which returns it to the initial position for the commencement of another cycle.

Referring to Figure 14, slip rings 140, communicate with brushes 141 to supply current during rotation of the stage element 22 to the valves 129 and 130.

It may thus be seen that I have invented novel and highly useful improvements in muffin tearing devices capable of high speed, commercial type operation in which the normal capacity may be of the order of several hundred muffins per minute. The muffins are accurately torn without distorting the same, and after the tearing operation the same may be reassembled or pressed together for subsequent packaging, so that they may maintain their original appearance.

I wish it to be understood that I do not consider the invention limited to the precise details of structure shown and set forth in this specification, for obvious modifications will occur to those skilled in the art to which the invention pertains.

I claim:

1. A machine for tearing english muffins and the like comprising: a rotating stage element, a plurality of muffin tearing elements mounted upon said stage element, means for rotating said stage element; each of said muffin tearing elements including a base plate member, a tine supporting frame slideably mounted on said base plate member, said frame including a first reciprocating member and a second member pivotally mounted on said reciprocating member stationary means and means rotated by said stage element to operate the tine supporting frame and its first and second members, said first and second members having muffin tearing tines thereon and having first and second relative positions, said tines on said first and second members being disposed in said first position in coplanar relation, and in said second position in non-coplanar relation; said frame having first and second positions relative to said base plate member; a muffin retaining member pivotally connected to said base plate member and including means selectively supporting a muffin in the path of sliding movement of said frame, and means selectively interconnecting said second pivotal member of said frame and said muffin supporting member in one of said relative positions of said frame with respect to said base plate member.

2. A machine for tearing english muffins and the like comprising: a rotating stage element, a plurality of muffin tearing elements mounted upon said stage element, means for rotating said stage element; each of said muffin tearing elements including a base plate member, a tine supporting frame slideably mounted on said base plate member, said frame including a first reciprocating member and a second member pivotally mounted on said reciprocating member stationary means and means rotated by said stage element to operate the tine supporting frame and its first and second members, said first and second members having muffin tearing tines thereon and having first and second relative positions, said tines on said first and second members being disposed in said first position in coplanar relation, and in said second position in non-coplanar relation; said frame having first and second positions relative to said base plate member; a muffin retaining member pivotally connected to said base plate member and including means selectively supporting a muffin in the path of sliding movement of said frame; and means raising and lowering said frame to project said tines into the body of a muffin during such time as said muffin retaining member supports a muffin in the path of said tines.

3. A machine for tearing english muffins and the like comprising: a rotating stage element, a plurality of muffin tearing elements mounted upon said stage element, means for rotating said stage element; each of said muffin tearing elements including a base plate member, a tine supporting frame slideably mounted on said base plate member, said frame including a first reciprocating member and a second member pivotally mounted on said reciprocating member stationary means and means rotated by said stage element to operate the tine supporting frame and its first and second members, said first and second members having muffin tearing tines thereon and having first and second relative positions, said tines on said first and second members being disposed in said first position in coplanar relation, and in said second position in non-coplanar relation; said frame having first and second positions relative to said base plate member; a muffin retaining member pivotally connected to said base plate member and including means selectively supporting a muffin in the path of sliding movement of said frame; and means selectively projecting and retracting said tines into the body of a muffin during such time as said muffin retaining member supports a muffin in the path of said tines.

4. A machine for tearing english muffins and the like comprising: a rotating stage element, a plurality of muffin tearing elements mounted upon said stage element, means for rotating said stage element; each of said muffin tearing elements including a base plate member, a tine supporting frame slideably mounted on said base plate member, said frame including a first reciprocating member and a second member pivotally mounted on said reciprocating member stationary means and means rotated by said stage element to operate the tine supporting frame and its first and second members, said first and second members having muffin tearing tines thereon and having first and second relative positions, said tines on said first and second members being disposed in said first position in coplanar relation, and in said second position in non-coplanar relation; said frame having first and second positions relative to said base plate member; a muffin retaining member pivotally connected to said base plate member and including means selectively supporting a muffin in the path of sliding movement of said frame; and pneumatic means selectively projecting and retracting said tines into the body of a muffin during such time as said muffin retaining member supports a muffin in the path of said tines.

5. A machine for tearing english muffins and the like comprising: a rotating stage element, a plurality of muffin tearing elements mounted upon said stage element, means for rotating said stage element; each of said muffin tearing elements including a base plate member, a tine supporting frame slideably mounted on said base plate member, said frame including a first reciprocating member and a second member pivotally mounted on said reciprocating member stationary means and means rotated by said stage element to operate the tine supporting frame and its first and second members, said first and second members having muffin tearing tines thereon and having first and second relative positions, said tines on said first and second members being disposed in said first position in coplanar relation, and in said second position in non-coplanar relation; said frame having first and second positions relative to said base plate member; a muffin retaining member pivotally connected to said base plate member and including means selectively supporting a muffin in the path of sliding movement of said frame; and means raising and lowering said frame to project said tines into the body of a muffin during such time as said muffin retaining member supports a muffin in the path of said tines; and means for moving said muffin retaining member and pivotal member of said frame element during such time as the same are disposed in mutual engagement into the body of a muffin during such time as said muffin retaining member supports a muffin in the path of said tines.

References Cited in the file of this patent

UNITED STATES PATENTS

| | | |
|---|---|---|
| 1,939,279 | Rogalewski | Dec. 12, 1933 |
| 2,403,517 | Gaddini | July 9, 1946 |
| 2,840,129 | Jovis | June 24, 1958 |

FOREIGN PATENTS

| | | |
|---|---|---|
| 145,284 | Sweden | May 18, 1954 |